(12) United States Patent
Gurfinkel

(10) Patent No.: US 7,311,818 B1
(45) Date of Patent: Dec. 25, 2007

(54) WATER SEPARATION UNIT

(76) Inventor: Benjamin Gurfinkel, 3571 Syracuse Ave., San Diego, CA (US) 92122

( * ) Notice: Subject to any disclaimer, the term of this patent is extended or adjusted under 35 U.S.C. 154(b) by 0 days.

(21) Appl. No.: 11/536,131

(22) Filed: Sep. 28, 2006

(51) Int. Cl.
*B07D 17/025* (2006.01)
*B01D 21/02* (2006.01)

(52) U.S. Cl. .................. 210/96.1; 210/103; 210/113; 210/521; 210/532.1; 210/538

(58) Field of Classification Search ............ 210/103, 210/113, 134, 961, 521, 538, 540, 523, 532.1
See application file for complete search history.

(56) References Cited

U.S. PATENT DOCUMENTS

| | | | | |
|---|---|---|---|---|
| 1,176,775 A * | 3/1916 | Morris | .................. | 210/521 |
| 2,759,557 A * | 8/1956 | Gordon | .................. | 210/538 |
| 3,144,408 A * | 8/1964 | Pascual | .................. | 210/538 |
| 3,251,471 A * | 5/1966 | Allen | .................. | 210/521 |
| 4,073,734 A * | 2/1978 | Lowrie | .................. | 210/532.1 |
| 4,383,922 A * | 5/1983 | Beard | .................. | 210/521 |
| 4,588,563 A * | 5/1986 | Fiocco | .................. | 210/532.1 |
| 4,780,206 A * | 10/1988 | Beard et al. | .................. | 210/521 |
| 5,171,432 A * | 12/1992 | Tabibzadeh | .................. | 210/256 |
| 6,919,033 B2 * | 7/2005 | Stark et al. | .................. | 210/532.1 |
| 7,083,721 B2 * | 8/2006 | McClure et al. | .................. | 210/532.1 |
| 2004/0055950 A1 * | 3/2004 | Bryant | .................. | 210/521 |

\* cited by examiner

*Primary Examiner*—Christopher Upton
(74) *Attorney, Agent, or Firm*—Frank Morkunas

(57) ABSTRACT

A water separation unit having an inner housing for storm water collection, separation of oils and debris from the storm water, and discharge of clean water. The inner housing is suspended inside an outer housing. The inner housing has a translatable floor with a plurality of hollow tubes extending upward from the floor and downward through the floor for passage of clean water from the inner housing and out the water separation unit. A plurality of conduits collect the clean water as it escapes from the inner housing and carries the clean water to a discharge tube and out the water separation unit.

15 Claims, 3 Drawing Sheets

WATER SEPARATION UNIT

CROSS REFERENCES TO RELATED APPLICATIONS

None.

STATEMENT REGARDING FEDERALLY-SPONSORED RESEARCH OR DEVELOPMENT

Not applicable.

BACKGROUND

This relates to an improvement in separators of particles from storm water, and more particularly to oil, water, and debris separators from storm water.

All municipalities have storm drains and sewer drains for movement of storm water and waste water for possible later processing and or disposal. All have an interest in containing and efficiently disposing of storm waters. Storm waters, and run-off water of the type associated with irrigation and hosing, typically will run down from various grades of slopes and into the streets ultimately into the storm drains. For the purpose of this disclosure, and unless otherwise clear from the text, storm water in general refers to actual storm water and run-off water as described above.

In the process of this movement and flow, storm water and run-off water will pick up minute particles of sand or stone, vegetation, silt, oils, and other debris. For the purpose of this disclosure, all oils will be referred to as oil and all other particles will be referred to as debris. Water coming from irrigation or from a homeowner's hose [while washing a vehicle, hosing down a sidewalk, and the like] is basically and relatively clean and usable water and, in many cases, even potable except for its collection of minute particles and oils as described above.

Because of contaminants such as the oils and debris mixing into this 'clean' water as it courses to and through the storm drains it is clearly rendered unsuitable for any domestic use let alone drinking. It was initially thought that, during a rain storm for instance, that the first 10 minutes of rain fall loosening all such debris and oils from the street and "flushed" the streets of the debris and oils. Such being the case, all following run-off water would be relatively clean. This has been found not to be the case.

Strategies and treatment of run-off water had to evolve around the reality that run-off water maintained unacceptable traces of debris and oils and were not suitable for instant re-use. Because of the inability to treat run-off water, or the undesirability to treat run-off water due to costs, a great deal of this potentially re-usable storm water is discharged into oceans, lakes, rivers, and the like thereby wasting a valuable resource.

Recognizing this as a waste of potentially re-usable water, many municipalities have embarked on efforts to reclaim usable and potable water from storm water. Several unique treatment devices have been developed and fitted into and around storm drains for separating debris and oils from storm water. BaySaver Technologies, Inc., for instance has developed particle-settling to diffusion device for this purpose which uses velocity and turbulence in the hydrodynamic environment to effect separation of debris and oils from storm water.

Other devices developed by Contech Construction Products, Inc., include (1) a below-grade system having a series of baffles to control flow and to minimize resuspension of settled pollutants and further has the ability to capture and retain extremely small particles, while discharging 'clean' water flows; and (2) an internal bypass which separates high storm water flows from a treatment chamber, eliminating washout.

A third known company for treatment of storm water is CDS Technologies, Inc. It has developed a system which uses available energy of the storm water flow to create a hydraulic system to cause a natural separation of debris from fluids. An internal swirl and concentrating process, the continuous circulating flow over perforated separation screens keeps the system from blocking. Debris is captured inside a separation chamber while storm water passes through the separation screens.

Most other systems use similar technologies to include screening, filtering cartridges, and other mechanically-induced forces. Each of these prior art devices and systems are well-suited for the intended purpose and efficient in operation and result. Many are more complex than others and some are relatively expensive at purchase and operation and maintenance. None are as simple and less expensive than that of the present water separation unit of this disclosure to exact the same or even better desired results.

Accordingly, several objects and advantages of the water separation unit of this disclosure are that it is simple and relatively inexpensive in construction, simple to install, easy to use, and easier to maintain while separating debris from storm water and oils from storm water and discharging potable water in the process.

The foregoing has outlined some of the more pertinent objects of the water separation unit of this disclosure. These objects should be construed to be merely illustrative of some of the more prominent features and applications of the water separation unit of this disclosure. Many other beneficial results can be attained by applying the disclosed water separation unit of this disclosure in a different manner or by modifying the water separation unit of this disclosure within the scope of the disclosure. Accordingly, other objects and a fuller understanding of the water separation unit of this disclosure may be had by referring to the summary of the water separation unit of this disclosure and the detailed description of the preferred embodiment in addition to the scope of the water separation unit of this disclosure defined by the claims taken in conjunction with the accompanying drawings.

SUMMARY

The above-noted problems, among others, are overcome by the water separation unit of this disclosure. Briefly stated, the water separation unit of this disclosure contemplates a water separation unit having an outer housing with a an inlet, and a discharge tube. An inner housing is suspended inside the outer housing is in communication with the inlet to permit the in-flow of storm water into the inner housing. A floor in the inner housing is not in contact with the bottom of the outer housing thereby defining a bottom space therebetween. The walls of the inside housing are not in direct contact with the walls of the outer housing thereby defining a side space therebetween. A plurality of tubes extend upward from the floor to an approximately horizontal tube plane. The tubes are in communication with the bottom space.

As storm water enters the inner housing through the inlet and builds up from the floor to a top plane, oils in the storm water at a separation plane separate upward from the storm water leaving water below the separation plane and above the tube plane to pass into the tubes and down to the bottom space for discharge of clean water from the water separation unit through the discharge tube.

The foregoing has outlined the more pertinent and important features of the water separation unit of this disclosure in order that the detailed description that follows may be better understood so the present contributions to the art may be more fully appreciated. Additional features of the water separation unit of this disclosure will be described hereinafter which form the subject of the claims. It should be appreciated by those skilled in the art that the conception and the disclosed specific embodiment may be readily utilized as a basis for modifying or designing other structures and methods for carrying out the same purposes of the water separation unit of this disclosure. It also should be realized by those skilled in the art that such equivalent constructions and methods do not depart from the spirit and scope of the water separation unit of this disclosure as set forth in the appended claims.

BRIEF DESCRIPTION OF THE DRAWINGS

For a fuller understanding of the nature and objects of the water separation unit of this disclosure, reference should be had to the following detailed description taken in conjunction with the accompanying drawings in which.

DETAILED DESCRIPTION

Figure 1:
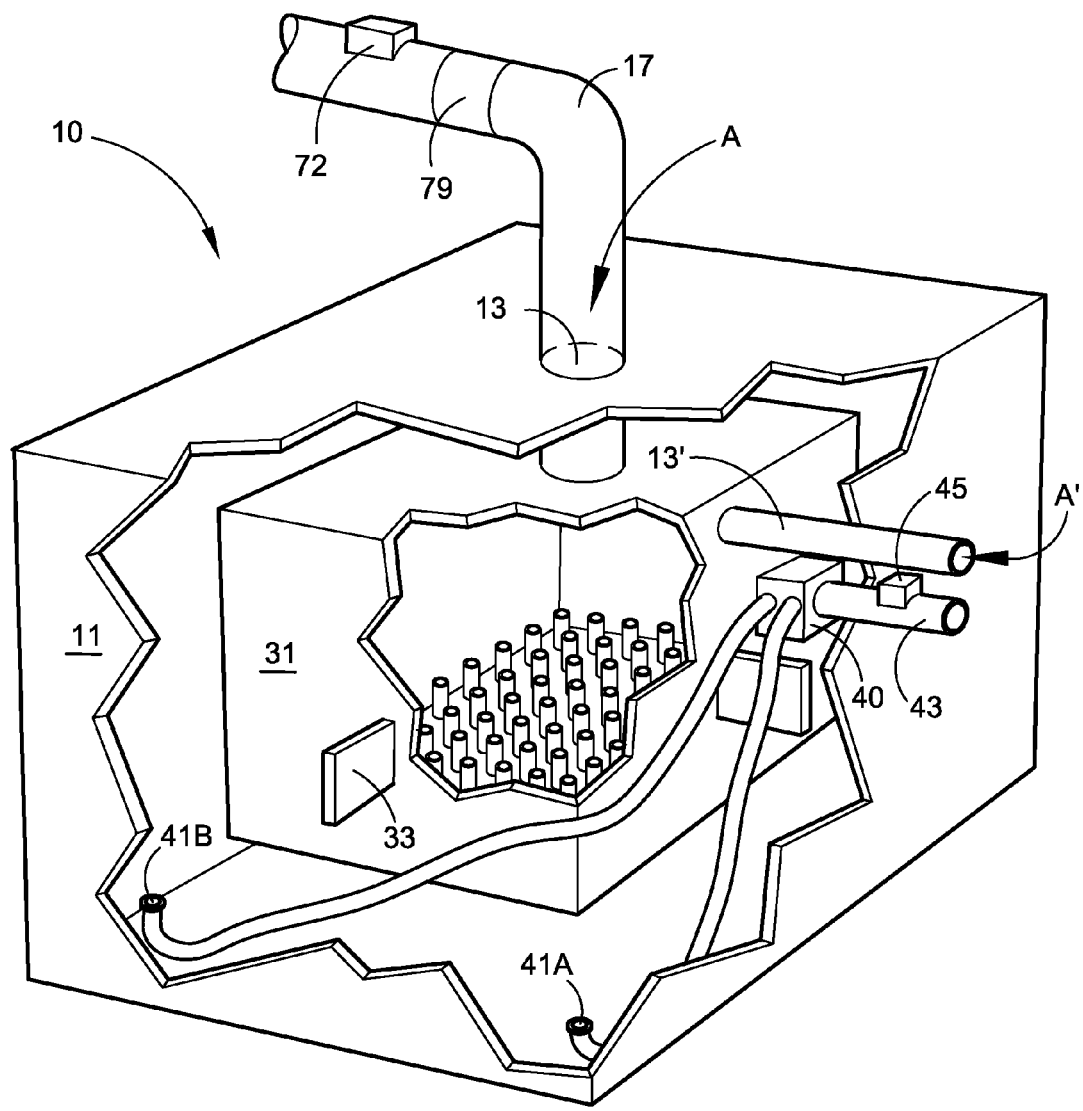
FIG. 1 is partially cut-away perspective view of the water separation unit of this disclosure.

Referring now to the drawings in detail and in particular to FIG. 1, reference character 10 generally designates a water separation unit constructed in accordance with a preferred embodiment of the water separation unit of this disclosure. It comprises an outer housing 11 and contained within the outer housing 11, and inner housing 31. The outer housing 11 has a bottom, a top, and side walls connected to each other and to the bottom and to the top thereby defining a container capable of holding fluids.

Figure 3:
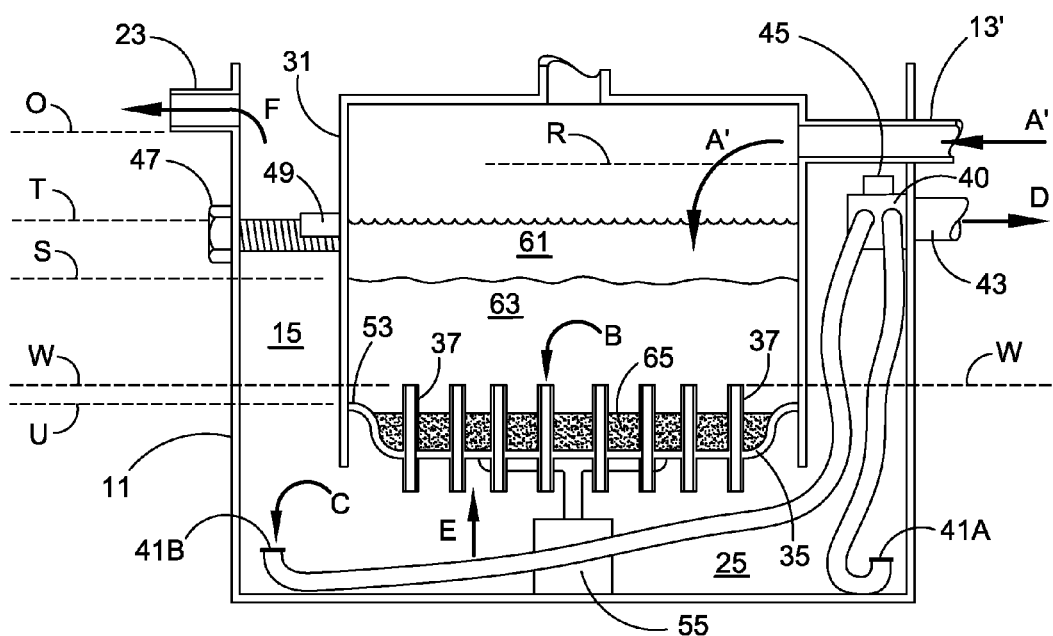
FIG. 3 is front elevation cut-away view, as taken on line 3-3 of FIG. 2, of the internal components of the water separation unit of this disclosure.
Figure 4:
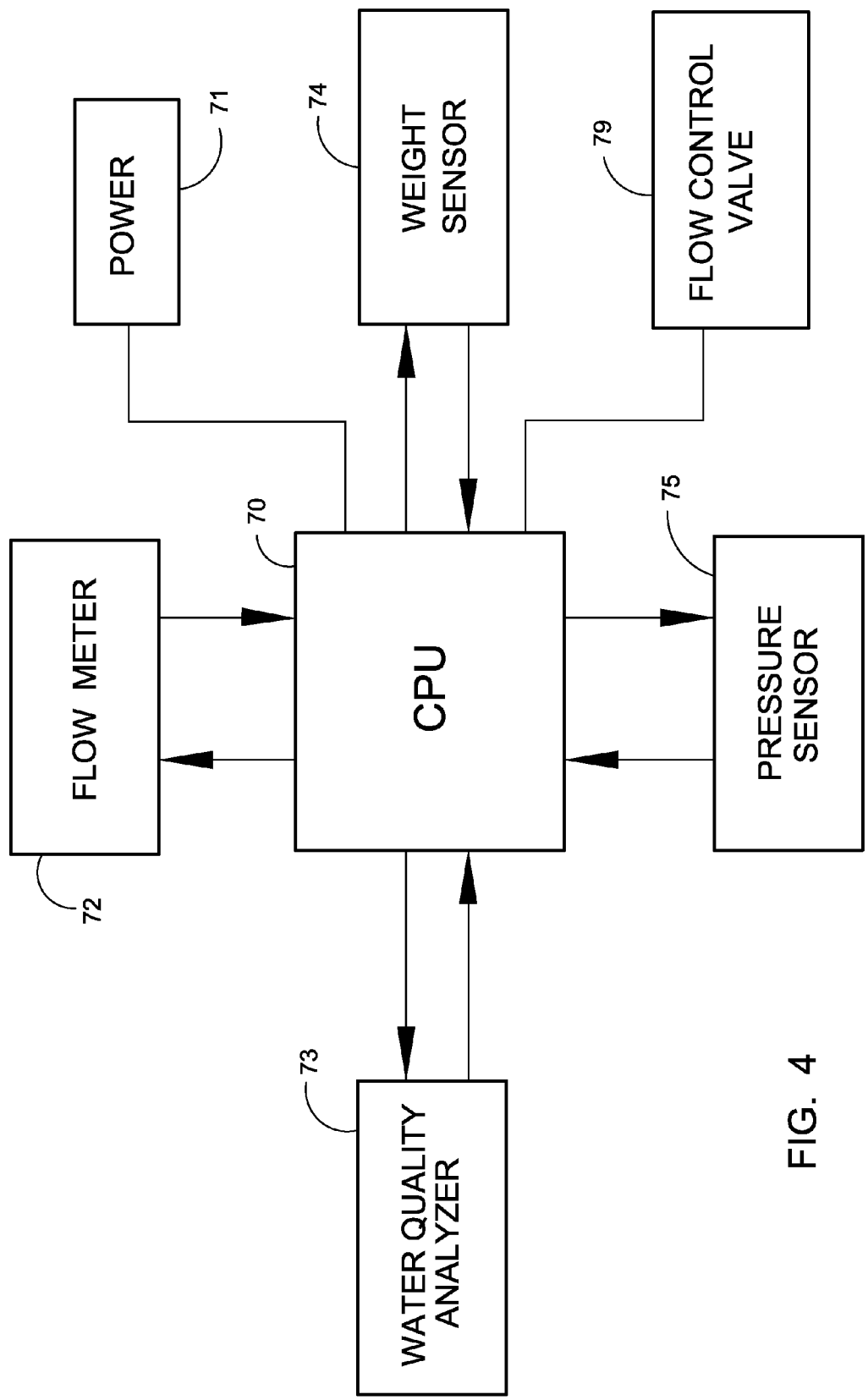
FIG. 4 is a flow chart depicting some operational components of the water separation unit of this disclosure.

As illustrated in FIGS. 1 and 3, the inner housing 31 also is a container also capable of holding fluids except for the hollow tubes 37 in the floor 35 of the inner housing 31 [to be described later]. The inner housing 31 is suspended above the bottom of the outer housing and away from the side walls of the outer housing. The inner housing also is configured with a top and side walls connected to each other and to the top.

Support members 33 connected to the outer surface of the inner walls and to the inner surface of the outer walls support and suspend the inner housing 31 above the bottom of the outer housing 11 and away from the outer walls. A side space 15 is defined between the inner walls and the outer walls. A bottom space 25 is defined below the floor 35 of the inner housing 31 and the bottom of the outer housing 11.

The support members 33 may be permanently attached to the inner walls and the outer walls as illustrated in FIG. 1 or may be configured to be removable in order that the inner housing 31 may be removed from the outer housing 11 as necessary. FIG. 3 refers. Here a saddle or cradle 49 is on the outer surface of the inner wall. A bolt 47 is passed through an aperture [not shown] on the outer wall and into a threaded aperture [not shown] in the inner wall. The cradle 49 is above the inner wall aperture. The bolt 47 and cradle 49 combination supports the inner housing 31 in a suspended relation to the outer housing 11 and creates and maintains the side space 15 and bottom space 25 as described above. One or more such bolt 47 and cradle 49 combinations may be on all sides of the outer wall and the inner wall.

Figure 2:
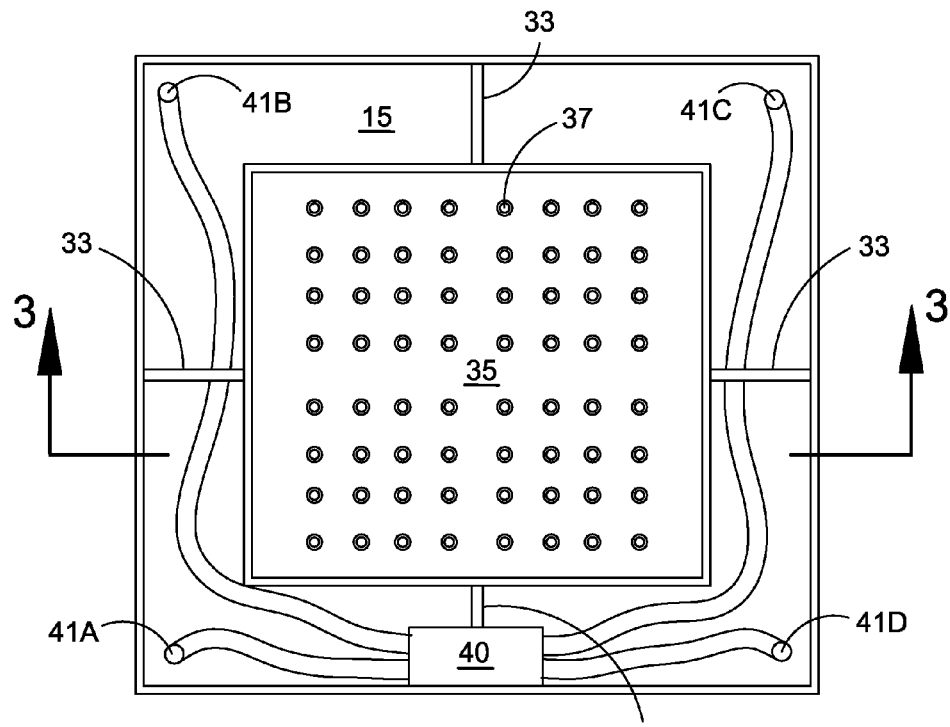
FIG. 2 is a top plan view, with top removed, of the water separation unit of this disclosure.

Attention is now invited to FIGS. 1 through 3. A plurality of hollow tubes 37 extend above and below the floor 35 to provide a passageway for fluids from the chamber of the inner housing 31 down and into the bottom space 25 and side space 15. The tops of each tube 37 is on the same horizontal plane referred to herein as a tube plane and represented by reference character W. The tube plane W, therefore, generally is static.

A top inlet 13 or side inlet 13' provide a passageway for fluid [i.e., storm water] to enter into the inner housing 31 from the outside. Whether a top location 13 or a side location 13' or both will be used will depend on where the water separation unit 10 will be placed for use. The water separation unit 10 may be configured with only a top inlet 13 or only a side inlet 13' or both with a valve in each to be placed in an open mode or a closed mode. A horizontal inlet plane is establish by the side inlet 13' and is represented by reference character R. The inlet plane R generally is static.

Storm water enters either at the top inlet 13, direction of Arrow A, or the side inlet 13', direction of Arrow A', and into the chamber of the inner housing 31. The inner housing 31 is fully enclosed except for the inlets above and the plurality of tubes 37 as described above. Storm water will accumulate upward from the floor 35. The upper level of the storm water build up is referred to herein as the top plane and represented by reference character T. Because this level and plane can change, the top plane T is dynamic.

Debris 65 will be separated downward by gravity and will settle on the floor 35. Over time and operation, it will build up. The upper plane of the build up of debris 65 is referred to herein as the sediment plane and represented by reference character U. Because this level and plane can change over time and build or removal, sediment plane U is dynamic.

Also and almost immediately oil 61 will separate upward from the storm water settling as clean water 63 above the debris 65 and below the oil 61. The point of separation between the oil 61 and the clean water 63 is referred to as the separation plane and is represented by reference character S. Since this plane can change over time and flow, the separation plane S is dynamic.

As storm water and clean water accumulate and rise, gravity and atmospheric pressure will cause the clean water 63 to pass into and through the tubes 37, in the direction of Arrow B, into the bottom space 25. Clean water 63 will then pass, in the direction of Arrow C, into the exposed openings of several conduits 41A-D located in the bottom space 25 and up and gather and concentrate into a manifold 40.

From here, the clean water 63 will be discharged from the water separation unit 10 through the discharge tube 43, in the direction of Arrow D, which is connected to the manifold 40 and is in communication with the outside environment or suitable collection or distribution unit [not shown]. An air relief valve 45 on the manifold 40 permits and facilitates the free flow of clean water 63 from the water separation unit 10. Although four such conduits 41A-D are shown, more or less, depending on the desired overall size of the water separation unit 10 and its location and efficiency, may be used.

For the free flow of clean water 63 as described above, the top plane T must be at or above the discharge tube 43 and the inlet plane R should generally be above the discharge tube 43. In the event of an uncontrollable influx of storm water into the water separation unit 10 and commensurate excess amount of clean water 63 being discharged from the inner housing 31 and build up of clean water 63 in the side space 15, an overflow tube 23 accommodates passage of clean water 63 out of the water separation unit 10, in the direction of Arrow F, and into a suitable container or distribution unit for further use or processing or both. The overflow tube 23 is at what is referred to herein as the overflow plane and is represented by reference character O. Typically the overflow plane O is static and is at or above the inlet plane R.

The floor 35 of the inner housing 31 is configured to move up, in the direction of Arrow E, and down accordingly. A sealing member 53 around the perimeter of the floor 35 prevents fluids from passing into or out of the inner housing 31. The floor 35 rests on a push rod or piston 55. The piston 55 is in the bottom space 25. The piston may be hydraulic, mechanical, or electrical.

The purpose of the piston 55 is to engage the piston 55 to move the floor 35 up to the top of the inner housing 31 when debris 65 has accumulated or built up to unacceptable levels or weights. When such occurs, the operation of the water separation unit 10 is shut down, the piston 55 engaged, the top of the inner housing 31 removed to expose the uplifted floor 35 so that the accumulated debris 63 may be removed or in the alternative, the floor 35 removed and replaced with a debris-free floor 35. Any conventional piston 55 suited for the intended purpose will suffice.

The bottom of the piston 55 is on the bottom of the outer housing 11 and the top of the piston 55 is on the outside surface floor 35 of the inner housing. The entire water separation unit 10 may be manually controlled or, preferably, controlled automatically with a conventional control unit or computer system 70 programmed to react to various predetermined situations and to control all operations for incoming storm water and discharge of clean water as described herebelow.

Any conventional power supply 71 will control the operation of the control unit 70. A flow meter 72 in the inlet pipe 17, in communication with the inlet 13, 13' for example, detects when storm water begins flowing into the water separation unit 10 and may be programmed to regulate and restrict its flow or to shut off the flow. Conventional valves 79, associated with the respective inlets 13, 13', and in communication with the control unit 70, provide this feature.

A water quality analyzer 73 in communication with the discharge tube 43 or the manifold 40 or both, is programmed to analyze the quality of the clean water 63 being discharged from the water separation unit 10. The water quality analyzer 73 may also be in communication with the overflow tube 23 for the same Conventional commercially valves in the discharge tube 43 and the overflow tube 23 [not shown] are in communication with the water quality analyzer 73 and the control unit 70 to cause the flow of water to be ceased when predetermined unacceptable quality levels are reached. This could happen when, for example, the sediment plane U, through accumulation of debris 65, rises above the tube plane W and debris 65 begins flowing through the tubes 37, the conduits 41A-D, and out the discharge tube 43; or with excessive and rapid influx of storm water into the inner housing 31 such that turbulence results preventing separation of oil 61 from storm water and preventing settlement of debris 65 from storm water. In such case, some oils 61 or some debris 65 or both may exit the inner housing 31 through the tubes 37, through the conduits 41A-D and out the discharge tube 43. The water quality analyzer 73 will detect such and cause the shut-off component 79 to shut down the system and close all valves until the situation normalizes.

A pressure sensor 75 in communication with the control unit 70 and the piston 55 detects that the piston is properly pressurized and ready for engagement.

A weight sensor 74 in communication with the floor 35 and the control unit 70 is programmed to detect when certain pre-determined weight levels of debris 65 have accumulated. When a pre-determined weight has been detected, the inlet valves and discharge valves will be shut to a closed mode, the piston 55 will be engaged, and the floor 35 raised, so that the debris 65 may be removed and the operation of the water separation unit 10 resumed.

The water separation unit 10 may be constructed of any suitable materials such as, but not limited to, concrete, plastics, and metals [preferably metals relatively impervious to oxidation or treated to be relatively impervious to oxidation]. The water separation unit 10 may be placed in any suitable locations associated with flowing storm water or collection points for storm water or both. One or more water separation unit 10 may be connected to other water separation unit 10, in series, to increase the capacity of water separation as necessary. In this regard, the overflow tube 23 of one water separation unit 10 may be connectable to the inlet 13, 13' of another water separation unit 10.

Studies have also shown that an oil barrier, such as essentially created inside the inner housing 31 at the separation plane S and above, acts to almost immediately bacteria in the clean water 63 below. Consequently, potable water is being discharged from the water separation unit 10 of the present disclosure.

The present disclosure includes that contained in the present claims as well as that of the foregoing description. Although this water separation unit of this disclosure has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the water separation unit of this disclosure. Accordingly, the scope of the water separation unit of this disclosure should be determined not by the embodiment[s] illustrated, but by the appended claims and their legal equivalents.

Applicant[s] have attempted to disclose all the embodiment[s] of the water separation unit of this disclosure that could be reasonably foreseen. It must be understood, however, that there may be unforeseeable insubstantial modifications to water separation unit of this disclosure that remain as equivalents and thereby falling within the scope of the water separation unit of this disclosure.

What is claimed is:

1. A water separation unit comprising:
   (a) an outer housing having a an inlet with an inlet plane, a discharge tube with a discharge plane, a bottom, a top, and outside walls;
   (b) an inner housing inside said outer housing wherein said inlet is in communication with said inner housing, said inner housing having a floor and inside walls wherein the floor of said inner housing is not in contact with the bottom of said outer housing thereby defining a bottom space therebetween and wherein said inner walls are not in direct contact with said outer walls thereby defining a side space therebetween; and (c) a plurality of tubes extending upward from said floor to an approximately horizontal tube plane, said tubes in communication with said bottom space;

whereby as storm water enters said inner housing through said inlet and builds up from said floor to a top plane, oils in said storm water at a separation plane separate upward from said storm water leaving water below the separation plane and above the tube plane to pass into said tubes and down to said bottom space for discharge of clean water from said water separation unit through said discharge tube.

2. The water separation unit of claim 1 further comprising one or more conduits between said inner housing and said outer housing, said one or more conduits having a first end and a second end wherein said first end is in said bottom space below said floor and in open communication with said bottom space and second end extends upward above said tube plane to said discharge tube.

3. The water separation unit of claim 2 further comprising a manifold on said outside wall of said outer housing to which each second end of said one or more conduits is attached, said manifold in open communication to and with said discharge tube.

4. The water separation unit of claim 3 further comprising an air relief valve on said manifold.

5. The water separation unit of claim 3 further comprising an overflow member above said inlet plane and on said outside wall for discharge of excess clean water from said water separation unit.

6. The water separation unit of claim 1 further comprising a support means for supporting said inner housing within said outer housing.

7. The water separation unit of claim 6 wherein said support means is attached to said outside wall and to said inside wall.

8. The water separation unit of claim 6 wherein said support means is removable from said outside wall and from said inside wall and said inner housing is removable from said outer housing.

9. The water separation unit of claim 1 wherein said floor is translatable up and down within said inner housing.

10. The water separation unit of claim 1 further comprising a piston attached in operable communication to said bottom and to said floor.

11. The water separation unit of claim 1 further comprising control means for controlling operation of said water separation unit and incoming flow of water and discharge of water.

12. The water separation unit of claim 11 further comprising weight sensing means for detecting by weight accumulation of debris on said floor.

13. The water separation unit of claim 11 further comprising flow detecting means for detecting flow of incoming storm water and regulating said flow of incoming storm water.

14. The water separation unit of claim 11 further comprising water quality analyzing means for detecting quality of clean water being discharged from said water separation unit.

15. The water separation unit of claim 14 further comprising flow cessation means for shutting the discharge of clean water from said water separation unit when quality of said water falls below a predetermined level.

* * * * *